United States Patent
Wu et al.

(10) Patent No.: US 7,970,402 B2
(45) Date of Patent: Jun. 28, 2011

(54) METHOD FOR PERFORMING HANDOVERS IN A COMMUNICATION SYSTEM

(75) Inventors: Yi Wu, Beijing (CN); Mikael Latvala, Helsinki (FI); Janne Tuononen, Helsinki (FI)

(73) Assignee: Nokia Corporation, Espoo (FI)

( * ) Notice: Subject to any disclaimer, the term of this patent is extended or adjusted under 35 U.S.C. 154(b) by 959 days.

(21) Appl. No.: 11/790,413

(22) Filed: Apr. 25, 2007

(65) Prior Publication Data

US 2008/0096562 A1  Apr. 24, 2008

(30) Foreign Application Priority Data

Oct. 24, 2006 (FI) .................................. 20060936

(51) Int. Cl.
*H04W 36/00* (2009.01)
(52) U.S. Cl. ........ 455/436; 455/437; 455/438; 455/439; 455/440; 455/444; 370/329; 370/330; 370/331; 370/349; 370/395.52; 709/203; 709/227; 709/228; 709/229; 709/230
(58) Field of Classification Search .................. 455/436, 455/437, 438, 439, 440, 441, 442, 443, 444; 370/329, 330, 331, 338, 349, 351, 352, 395.52; 709/203, 227, 228, 229, 230
See application file for complete search history.

(56) References Cited

U.S. PATENT DOCUMENTS

| | | | |
|---|---|---|---|
| 6,850,503 B2 * | 2/2005 | Dorenbosch et al. | 370/331 |
| 7,184,418 B1 * | 2/2007 | Baba et al. | 370/331 |
| 7,242,678 B2 * | 7/2007 | O'Neill et al. | 370/349 |
| 2005/0073981 A1 * | 4/2005 | Banerjee et al. | 370/338 |
| 2007/0002869 A1 * | 1/2007 | Miller | 370/395.32 |
| 2007/0086385 A1 | 4/2007 | Suh et al. | |
| 2007/0086386 A1 | 4/2007 | Suh et al. | |

OTHER PUBLICATIONS

Dreibholz T. et al., "A New Scheme for IP-based Internet-Mobility," Local Computer Networks, 2003. LCN '03. Proceedings 28th Annual IEEE International Conference on Oct. 20-24, 2003, Piscataway, NJ, USA, IEEE., whole document.
Koh S. , et al., Mobile SCTP (mSCTP) for IP Handover Support; draft-sjkoh-msctp-01.txt. IETF Standard-Working-Draft, Internet Engineering Task Force, IETF, CH. Oct. 2005., whole document.
International Search Report, PCT/FI2007/050569, filed Oct. 22, 2007.
"Stream Control Transmission Protocol (SCTP) Dynamic Address Reconfiguration", draft-ietf-tsvwg-addip-sctp-08.txt, R. Stewart, et al., Network Working Group, Internet-Draft, Expires: Mar. 24, 2004, Sep. 24, 2003, pp. 1-37.

* cited by examiner

*Primary Examiner* — Olumide T Ajibade Akonai
(74) *Attorney, Agent, or Firm* — Mintz, Levin, Cohn, Ferris, Glovsky and Popeo, P.C.

(57) ABSTRACT

The invention relates to a method wherein a transport layer association is established. Thereafter, a handover condition is detected in the first mobile node, which obtains a second address. The second address is updated to a first name server node. A query message is sent to a second name server node for an address of the second mobile node. The second address is indicated to the second mobile node. The first mobile node waits for a response from the second name server node or the second mobile node. Upon receiving a new address for the second mobile node from the second name server node, the first mobile node repeats the indication of the second address of the first mobile node to the second mobile node using the new address as a destination address for the second mobile node.

25 Claims, 8 Drawing Sheets

METHOD FOR PERFORMING HANDOVERS IN A COMMUNICATION SYSTEM

BACKGROUND OF THE INVENTION

1. Field of the invention

The invention relates to mobile communication networks and mobile terminal. Particularly, the invention relates to a method for the performing of handovers in a communication system.

2. Description of the Related Art

Currently mobility is provided for nodes employing Internet Protocol (IP) connectivity on protocol layers below the network layer. This means that the mobility is hidden from the network layer, that is, the IP layer, and that the node IP address remains the same throughout a continuous communication session. The maintaining of the connection and the relaying of data to the current location of the node is left for dedicated mobile networks such as the General Packet Radio Service (GPRS) core network. However, it would be beneficial to be able to rely on IP routing in the relaying of packet data to the current location of the node, which provides a number of benefits, for example, reduced investments in network equipment and simplified system maintenance. The support for mobility in the network layer requires the changing of IP address when the network access point is changed. This introduces the problem of maintaining an ongoing communications session with a peer node, which is not aware of the changes in the IP address.

One method of dealing with this problem is provided by Mobile IP, which is defined by Internet Engineering Task Force (IETF). In Mobile IP a mobile node is accessed via a home agent, which provides a permanent address for the mobile node. Before a route optimization procedure is performed, at least all terminating packets are routed via the home agent. The mobile node obtains a care-of address from its current network and registers the care-of address to the home agent. The home agent routes the packets to the care-of address using IP tunneling. The problem with mobile IP is that it introduces a significant delay to the packet stream. Further problems are related to firewalls and network security, which in effect mandate that outgoing packets should also be tunneled to the home agent before they may be routed independently. Due to these reasons, mobile IP is considered not to provide an ultimate solution for terminal portability. There also exists the possibility to deal with the problem on the transport layer, for example, on the Transmission Control Protocol (TCP) layer by splitting a transport layer connection to two parts and to have a transport layer proxy. Another transport layer protocol is the Stream Control Transmission Protocol (SCTP), the benefit of which is the support for multi-homing, namely, the support of multiple concurrent IP addresses for a communication party relating to a single transport layer association. In the case of failure to communicate with one of the IP address, a second address may be attempted.

Figure 1A:
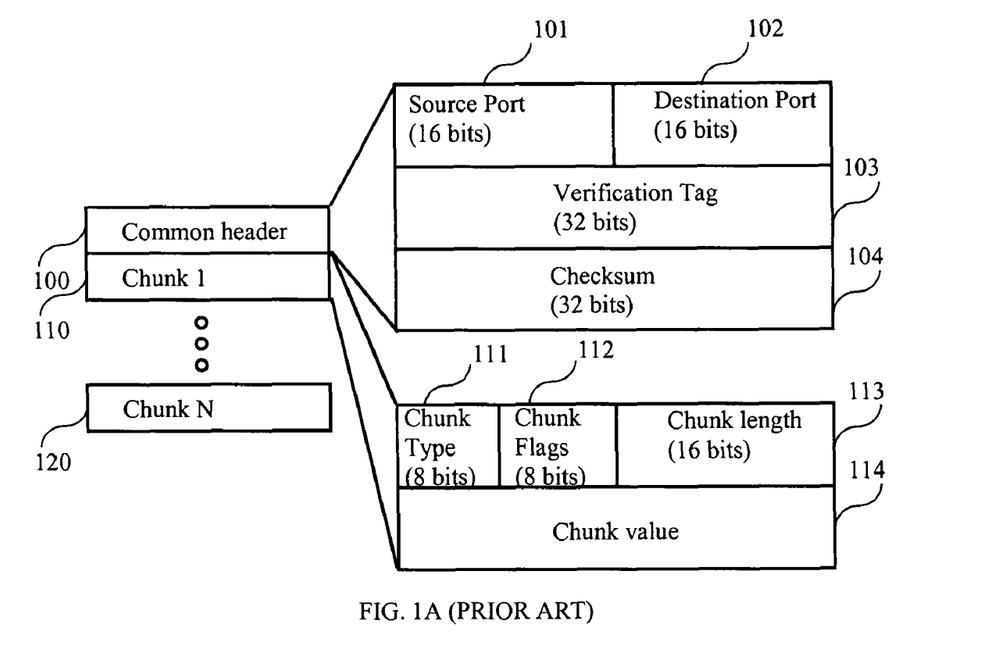
FIG. 1A is block diagram illustrating the structure of a Stream Control Transmission Protocol (SCTP) packet in prior art.

Reference is now made to FIG. 1A, which is a block diagram illustrating the structure of a Stream Control Transmission Protocol (SCTP) packet in prior art. The SCTP is described in detail in Internet Engineering Task Force (IETF) document RFC 2960. SCTP performs tasks of a transport layer in the Open System Interconnection (OSI) model of data communications. In FIG. 1A there is show an SCTP packet, which comprises a common header 100 and a number of chunks. The chunks are distinct SCTP protocol messages. There may be N different chunks in a given packet, where the letter N stands for an arbitrary integer. The number of chunks within a given packet is only limited by the Maximum Transmission Unit (MTU) size on the IP layer. The SCTP specification also governs the allowed combinations of SCTP chunks in a single packet. For example, an initiation chunk INIT may not be bundled together with other chunks to an IP packet. In FIG. 1A there are shown two chunks, namely a chunk 110 and a chunk 120. The possible intervening chunks are not shown. The common header shared by all chunks in a packet consists of a source port number 101, a destination port number 102, a verification tag 103 and a checksum 104. The source and destination addresses are carried in the IP layer packet header. Verification tag 103 is used to associate an SCTP chunk with a given SCTP association. Verification tag 103 must remain the same during the SCTP association as soon as received in an INIT or INIT ACK chunk for the peer. Associated with chunk 110 there are shown the chunk specific fields that are present in every chunk. There is a chunk type field 111, which identifies the SCTP message, that is, the chunk. There are also chunk flags 112, a chunk length 113, and a chunk value 114. Chunk value 114 comprises the chunk type specific fields.

Figure 1B:
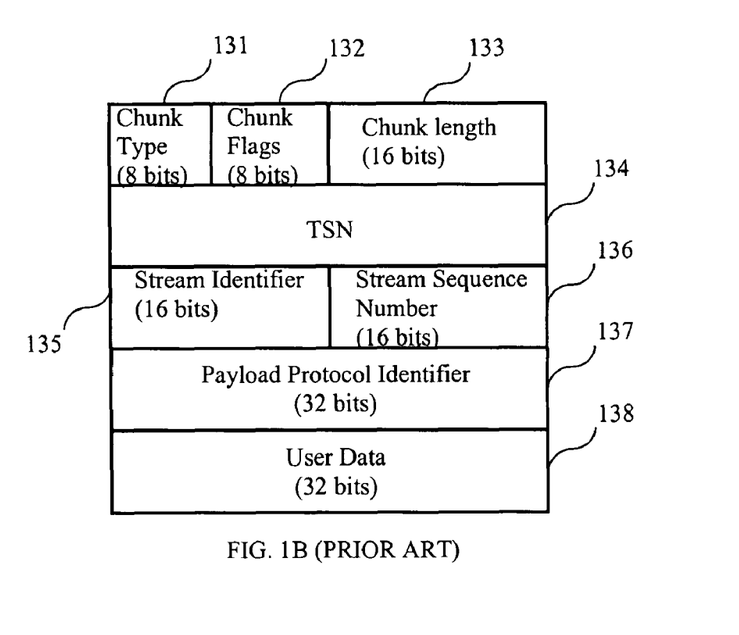
FIG. 1B is block diagram illustrating the structure of a Stream Control Transmission Protocol (SCTP) data chunk in prior art.

Reference is now made to FIG. 1B, which is a block diagram illustrating the structure of a Stream Control Transmission Protocol (SCTP) DATA chunk in prior art. The DATA chunk is used to carry upper layer protocol data to the peer. It is illustrated as an example of the structure in an SCTP protocol message, that is, a chunk. The DATA chunk comprises a chunk type 131, chunk flags 132, a chunk length 133, a Transmission Sequence Number (TSN) 134, a stream identifier 135, a stream sequence number 136, a payload protocol identifier 137 and user data 138. In the case of the DATA chunk the chunk type has the value 0. Chunk flags 132 comprise a flag indicating an unordered DATA chunk and chunk fragment end and beginning flags. The end and beginning flags are used in the adaptation to the IP layer MTU size if the DATA chunk does not fit to a single IP packet. The transmission sequence number indicates number for the DATA chunk and it is used in the detection of duplicate or missing DATA chunks. It should be noted that SCTP supports selective acknowledging with a SACK chunk, which allows a certain number of gaps in the TSNs received and thus avoids the need for the resending of all pending DATA chunks in the case of isolated lost DATA chunks. Due to the fact that SCTP supports multiple parallel streams, stream identifier 135 is used to identify the stream to which the DATA chunk is associated. Stream sequence number 136 represents the stream sequence number for the following user data within the stream specified with stream identifier 135. Payload protocol identifier 137 is used to identify the upper layer protocol, the message of which is carried in user data 138. An extension of SCTP supports the adding and removing of peer IP addresses during an existing SCTP association with Address Configuration Change (ASCONF) chunks.

However, a problem associated with prior art transport protocols is that they do not provide support for cases where both transport layer connection or association parties are mobile nodes. It should be noted that the problem is not specific to TCP or SCTP, but similar problems are present in any transport layer protocols.

SUMMARY OF THE INVENTION

The invention relates to a method comprising: establishing a transport layer association between a first mobile node and a second mobile node, said first mobile node using a first address in said establishing of said transport layer association; detecting a handover condition in said first mobile node;

obtaining a second address for the use of said first mobile node; updating said second address of said first mobile node to a first name server node; indicating said second address of said first mobile node to said second mobile node; waiting for a response from said second mobile node in said first mobile node; upon receiving a new address for said second mobile node from said second name server node, repeating said indication of said second address of said first mobile node to said second mobile node, said indication using said new address as a destination address for said second mobile node. The invention relates also to an electronic device comprising: a transport entity configured to establish a transport layer association between said electronic device and a second mobile node, said electronic device using a first address in said establishing of said transport layer association, to receive a second address for the use of said electronic device, to indicate said second address of said electronic device to said second mobile node, to wait for a response from said second mobile node, upon receiving a new address for said second mobile node from said second name server node, to repeat said indication of said second address of said electronic device to said second mobile node, said indication using said new address as a destination address for said second mobile node; a network entity configured to update said second address for said electronic device to a first name server node; and a network interface configured to detect a handover condition. The invention relates also to an electronic device comprising: means for establishing a transport layer association between said electronic device and a second network node, said electronic device using a first address in said establishing of said transport layer association; means for detecting a handover condition; means for obtaining a second address for the use of said electronic device; means for updating said second address of said electronic device to a first name server node; means for indicating said second address of said electronic device to said second mobile node; means for waiting for a response from said second mobile node in said electronic device; and means for repeating said indication of said second address of said electronic device to said second mobile node upon receiving a new address for said second mobile node from said second name server node, said repetition of said indication using said new address as a destination address for said second mobile node. The invention relates also to a communication system comprising: a mobile node configured to establish a transport layer association to a second mobile node, said mobile node using a first address in said establishing of said transport layer association, to detect a handover condition, to obtain a second address, to update said second address of said mobile node to a first name server node, to indicate said second address to said second mobile node, to wait for a response from said second mobile node, upon receiving a new address for said second mobile node from a second name server node, to repeat the indication of said second address of said mobile node to said second mobile node, said repeated indication using said new address as a destination address for said second mobile node; said second mobile node configured to establish a transport layer association with said mobile node and to receive an indication of said second address of said mobile node; and said first name server node configured to update of said second address for said mobile node.

The invention relates also to a computer program comprising code adapted to perform the following steps when executed on a data-processing system: establishing a transport layer association between a first mobile node and a second mobile node, said first mobile node using a first address in said establishing of said transport layer association; obtaining a second address for said first mobile node; updating said second address of said first mobile node to a first name server node; indicating said second address of said first mobile node to said second mobile node; waiting for a response from said second mobile node; upon receiving a new address for said second mobile node from said second name server node, repeating said indication of said second address of said first mobile node to said second mobile node, said repetition of said indication using said new address as a destination address for said second mobile node.

In one embodiment of the invention, the transport entity within the electronic device is configured to send a query message for an address of said second mobile node to a second name server node. The transport entity may be configured to send the query message for the address of said second mobile node in the case of failure to receive a reply from the second mobile node.

In one embodiment of the invention, the transport entity within the electronic device is configured to wait for a response from said second name server node. The transport entity is configured to wait for response from the second name server node or the second mobile node for a predefined time. Upon receiving a response comprising a new address for the second mobile node from said second name server node, the transport entity within the first mobile node is configured to repeatedly indicate said second address of said first mobile node to said second mobile node using said new address for said second mobile node.

In one embodiment of the invention, a transport entity within the second mobile node is configured to receive the second address of the first mobile node. The transport entities within the first mobile node and the second mobile node are configured to recovering the transport layer association between the first mobile node and the second mobile node based on the second address of the first mobile node.

In one embodiment of the invention, the transport entity within the electronic device is configured to send an initial query message for an address of said second mobile node to said second name server node from said electronic device, to receive an initial address of said second mobile node to said electronic device and to store a logical name for said second mobile node in said electronic device. The transport entity may be, for example, a software component comprising program code stored in the random access memory of the electronic device.

In one embodiment of the invention, the transport entity within the electronic device is configured to start a timer for the receiving of said new address for said second mobile node from said second name server node or for the receiving of an acknowledgement for the indication of said second address of said electronic device from said second mobile node; and, upon expiry of said timer, configured to repeat said sending of a query message for an address of said second mobile node to a second name server node and said indication of said second address of said electronic device to said second mobile node. The transport entity may be, for example, a software component comprising program code stored in the random access memory of the electronic device.

In one embodiment of the invention, the repeating of the indication step, that is, the repeating of the indication of said second address of said first mobile node to said second mobile node comprises the sending of an indication message anew to the second mobile node.

In one embodiment of the invention, a communication entity within the first name server node is configured to receive an address update message in said first name server node. A dispatcher entity in said first name server node is configured to extract a logical name from said address update message, to check whether said logical name is associated with a mobile node and to assign a higher priority to the updating of said address if said logical name is associated with a mobile node.

In one embodiment of the invention, a communication entity within the first name server node is configured receive a query message, the query message providing a logical name. For example, a fully qualified domain name. The communication entity is configured to check whether the logical name is associated with a mobile node. The communication entity is also configured to assign a higher priority to the processing of the query message if the logical name is associated with a mobile node.

In one embodiment of the invention, the electronic device comprises the second mobile node.

In one embodiment of the invention, said first name server node comprises a domain name server. A number of domain name servers may participate in the resolving of a logical name to an IP address. The logical name may be a fully qualified domain name. In one embodiment of the invention, said second name server node comprises a domain name server.

In one embodiment of the invention, the first and the second addresses and the new address for the second mobile node are IP addresses.

In one embodiment of the invention, said first name server comprises at least part of a distributed hash table for the mapping of logical names to network node addresses such as IP address. The distributed hash table may be stored in a number of network nodes.

In one embodiment of the invention, said transport layer association comprises a Stream Control Transmission Protocol (SCTP) association. In one embodiment of the invention, the association comprises a connection.

In one embodiment of the invention, said transport layer association comprises a Transmission Control Protocol (TCP) connection.

In one embodiment of the invention, said first mobile node comprises a mobile station within a mobile communication system.

In one embodiment of the invention, said first mobile node comprises a wireless local area network terminal.

In one embodiment of the invention, the communication system comprises a packet switched network, for example, an Internet Protocol (IP) network. A network address may be an IP address.

In one embodiment of the invention, said communication system comprises a mobile communication network. In one embodiment of the invention, said terminal comprises a mobile station or generally a mobile terminal. In one embodiment of the invention, the communication system comprises at least one of a Global System of Mobile Communications (GSM) network and a Universal Mobile Telephone System (UMTS) network. The terminal may be, for example, a GSM mobile station or a UMTS mobile station with a dual mode or multimode functionality to support different access types.

In one embodiment of the invention, the computer program is stored on a computer readable medium. The computer readable medium may be a removable memory card, magnetic disk, optical disk or magnetic tape.

In one embodiment of the invention, a transport layer association is established between a first mobile node and a second mobile node. Thereafter, a handover condition is detected in the first mobile node, which obtains a second address. The second address is updated to a first name server node. A query message is sent to a second name server node for an address of the second mobile node. The second address is indicated to the second mobile node. The first mobile node waits for a response from the second name server node or the second mobile node. Upon receiving a new address for the second mobile node from the second name server node, the first mobile node repeats the indication of the second address of the first mobile node to the second mobile node using the new address as a destination address for the second mobile node.

The embodiments of the invention described hereinbefore may be used in any combination with each other. Several of the embodiments may be combined together to form a further embodiment of the invention. A method, a communication system, a network node or a computer program to which the invention is related may comprise at least one of the embodiments of the invention described hereinbefore.

The benefits of the invention are related to improved reliability of connections in a communication system. A double handover where both the first and the second mobile nodes perform a handover and obtain new network addresses may be handled in an organized way.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 2:
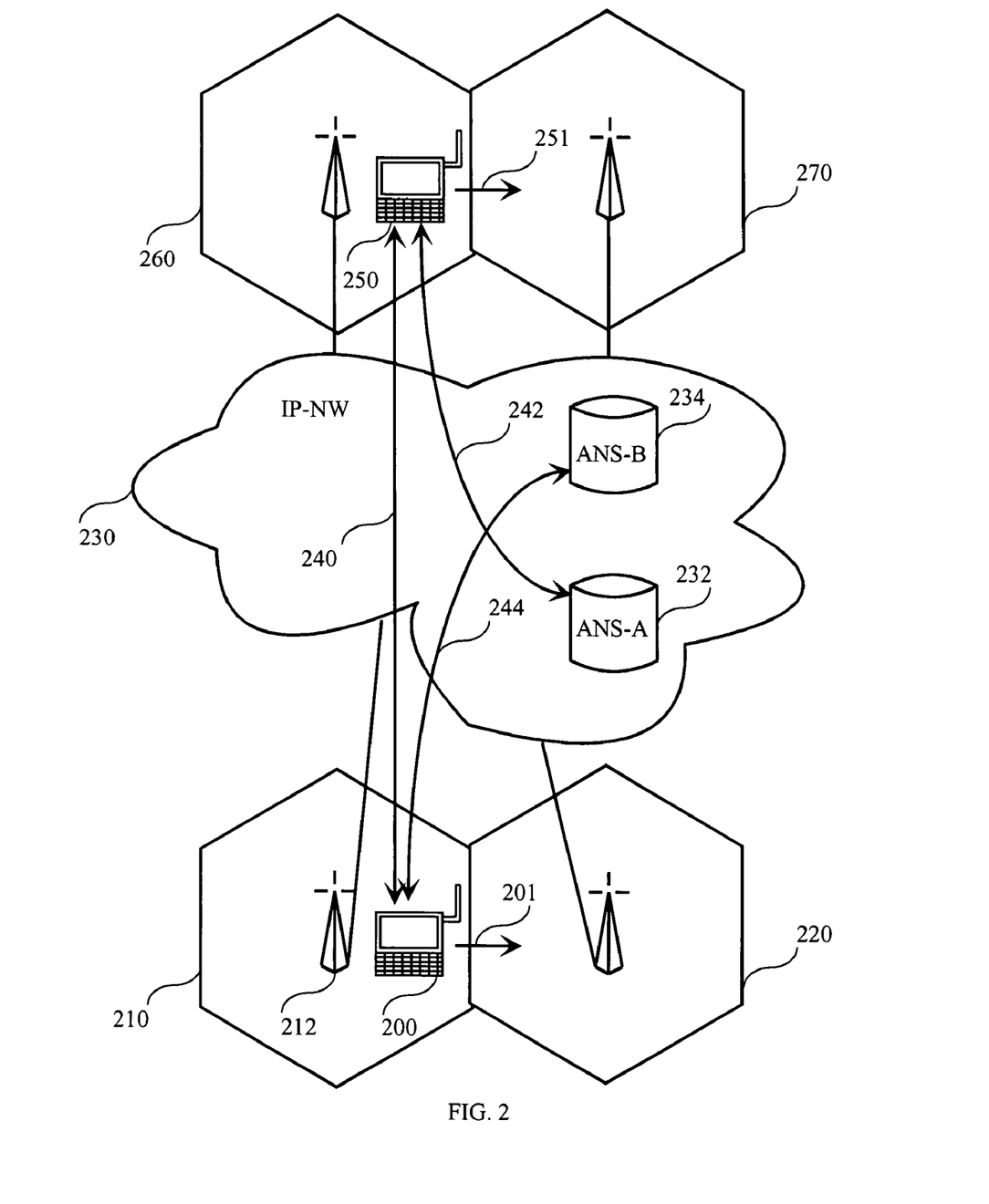
FIG. 2 is a block diagram illustrating two mobile nodes performing a simultaneous handover in one embodiment of the invention.

FIG. 2 is a block diagram illustrating two mobile nodes that perform a simultaneous handover in one embodiment of the invention. FIG. 2 illustrates a brief moment in time during which the simultaneous handovers are performed. In FIG. 2 there are illustrated four radio cells, namely cells 210, 220, 260 and 270. Each cell is provided by a Base Transceiver Station such as BTS 212. In FIG. 2 it is assumed that cells 210 and 220 are used by a mobile station 200, whereas cells 260 and 270 are used by a mobile station 250. It should be noted that in any practical embodiment of the invention there may be any number of cells used by an arbitrary number of mobile stations. Further, outside the time window illustrated in FIG. 2 mobile stations 200 and 250 may use any other cell. There is also shown an IP network 230. IP network 230 comprises at least two domain name servers, namely, Authoritative Name Servers (ANS) 234 and 232. ANS 232 and 234 store information on the current IP addresses of mobile stations 200 and 250, respectively. The IP address of a given mobile station may be obtained by enquiring the ANS for the mobile station with a logical name, for example, a Fully Qualified Domain Name (FQDN). The enquiry from mobile station 200 for obtaining the current IP address of mobile station 250 is illustrated with double-headed arrow 244. Similarly, the enquiry from mobile station 250 for obtaining the current IP address of mobile station 200 is illustrated with double-headed arrow 242. The transport layer association formed between mobile stations 200 and 250 is illustrated with double-headed arrow 240. The handovers of mobile stations 200 and 250 from their original cells 210 and 260 to their new cells 220 and 270 are illustrated with arrows 201 and 251, respectively. Whenever a mobile station performs a handover and obtains a new IP address, the mobile station must update the new IP address to its ANS. Thereupon, the mobile station starts the enquiry of the peer ANS to ensure correct operation even in the case the peer performs a handover simultaneously. The mobile station initiates simultaneously an address update to the peer wherein the mobile station indicates the new IP address to the peer. A successful address update indicates that the peer is not in the process of performing a handover that would have changed the IP address prior to the receiving of the address update.

Figure 3:
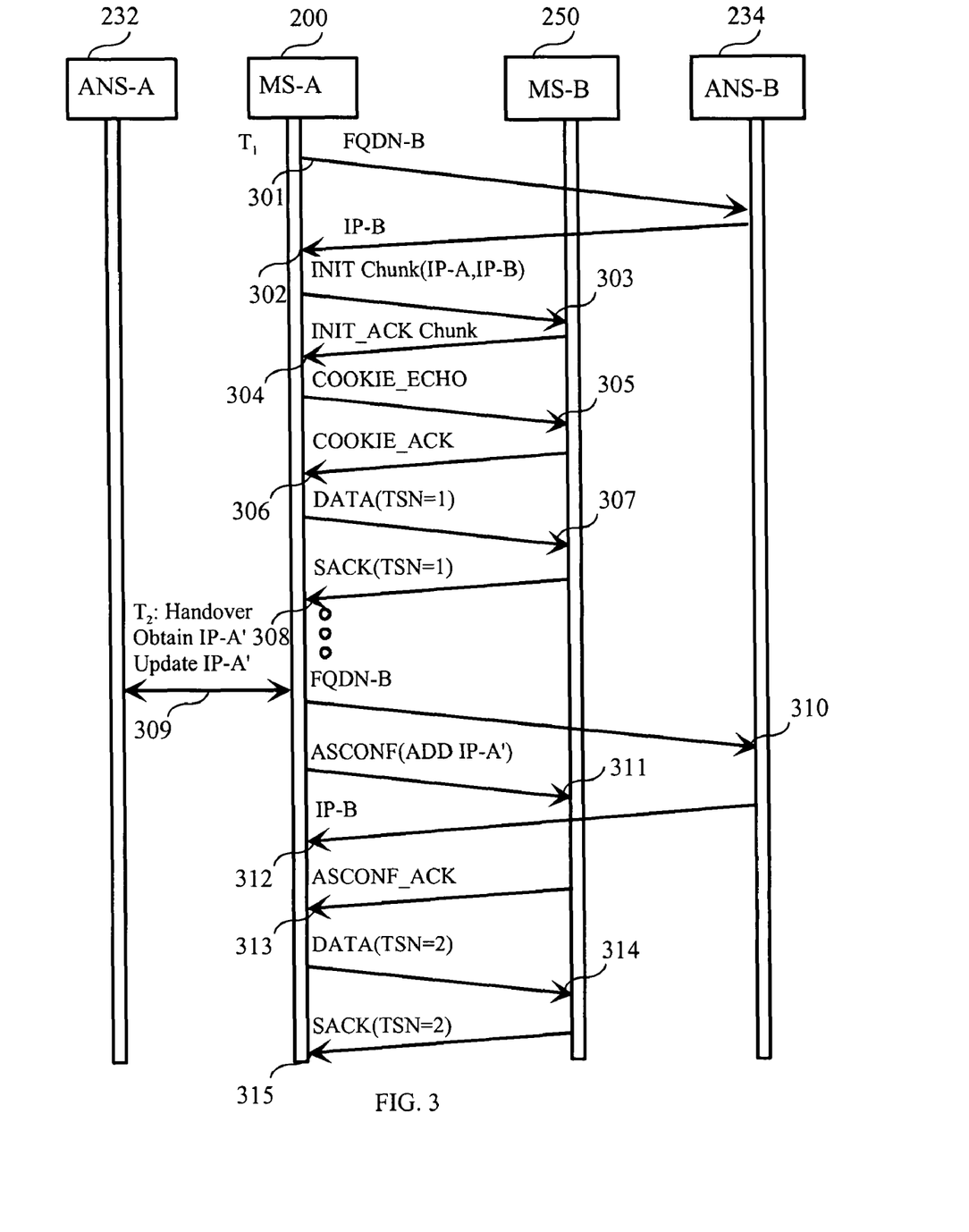
FIG. 3 is a message sequence chart illustrating transport connection handover in one embodiment of the invention.

FIG. 3 is a message sequence chart illustrating transport connection handover in one embodiment of the invention. In FIG. 3 there are illustrated Authoritative Name Servers ANS-A 232 and ANS-B 234. There are also two mobile stations, namely, mobile station 200 and mobile station 250. Mobile station 200 is the initiating party for the establishing of an SCTP association between mobile stations 200 and 250, hence it is also indicated as MS-A, whereas mobile station 250 is also indicated as MS-B.

At time $T_1$ mobile station 200 detects a need to establish an SCTP association to mobile station 250. The need may be related to the establishing of, for example, a Session Initiation Protocol (SIP) session with mobile station 250. Mobile station 200 sends an enquiry message to ANS-B 234, as illustrated with arrow 301. The enquiry message provides the FQDN for mobile station 250, namely FQDN-B. The response message illustrated with arrow 302 carries the current IP address of mobile station 250, namely IP-B. Mobile station 200 stores the FQDN-B in its memory for further use during possible handover processing.

In one embodiment of the invention, the authoritative name server enquiries or updates relating to mobile node logical names are given higher priority in name server nodes. Thus, they are put to a higher priority processing queue and the rest of the enquiries a processed from a lower priority queue. In one embodiment of the invention, the mobile node logical names have a distinguishing feature that enables them to be separate from other logical name. For example, a mobile node logical FQDNs may have a postfix or a prefix, which separates them from other FQDNs. A postfix may comprise at least one name element separated by a full stop "." character.

Thereupon, mobile station 200 sends an SCTP INIT chunk to mobile station 250 as illustrated with arrow 303. The INIT chunk is carried in an IP packet, which specifies IP-B as the destination address and IP-A, the address of mobile station 200, as the source address. An INIT chunk may also specify a number of other IP addresses via which mobile station 200 is also reachable should there be other such IP addresses. Herein it is assumed that IP-A is the only address for mobile station 200. An INIT chunk also carries the number of outbound and inbound streams associated with the SCTP association, advertised receiver window credit, an initial TSN and an initiate tag. The initiate tag is used as the verification tag in all chunks sent by mobile station 250 during the SCTP association. INIT chunk 303 is acknowledged by mobile station 250 to mobile station 200 with INIT ACK chunk, as illustrated with arrow 304. The INIT ACK chunk may specify a number of other IP addresses via which mobile station 250 is reachable. Herein it is assumed that IP-B is the only address for mobile station 250. An INIT ACK chunk also carries the number of outbound and inbound streams agreed to by mobile station 250, advertised receiver window credit, an initial TSN and an initiate tag. The initiate tag will be used as the verification tag in all chunks sent by mobile station 200 during the SCTP association. An INIT ACK also contains a state cookie that comprises all necessary association state and parameter information to create the association along with a Message Authentication Code (MAC). The state cookie is used by mobile station 250 to be protected against denial of service attacks in the form of SCTP association initiations without a state keeping initiator. The INIT ACK chunk 304 is acknowledged by mobile station 200 with COOKIE ECHO chunk to mobile station 250, as illustrated with arrow 305. The COOKIE ECHO chunk returns the state cookie provided in the INIT ACK chunk. Upon receiving the COOKIE ECHO chunk mobile station 250 checks the state cookie by taking all necessary association state and parameter information and by repeatedly computing the MAC. If the association state and parameter information plus the MAC match the ones sent in the state cookie within INIT ACK, the cookie is considered valid in mobile station 250, which acknowledges the state cookie with COOKIE ACK chunk, as illustrated with arrow 306. At this stage the SCTP association initialization process is complete. Thereafter, mobile stations 200 and 250 may start exchanging DATA chunks that comprise upper layer protocol information. For example, mobile station 200 sends a DATA chunk with TSN value 1 to mobile station 250, as illustrated with arrow 307. The DATA chunk 307 is acknowledged by mobile station 250 with a SACK chunk, the TSN parameter of which indicates the successful receiving of the DATA chunk numbered 1. The SACK chunk is illustrated with arrow 308.

At time $T_2$ mobile station 200 detects a need to perform a handover to a new cell. This is due to, for example, better radio connection quality in the new cell or an explicit handover request from a radio network node, which in turns may relate to capacity shortage in the original cell. Mobile station 200 moves to the area of a new cell wherein it is connected to a new access point and thus need a new IP address. The new IP address is obtained, for example, from a Dynamic Host Configuration Protocol (DHCP) server (not shown) accessed via the new cell. After the obtaining of the new IP address, namely address IP-A', mobile station 200 updates ANS-A 232 to associate IP-A' with the logical name of mobile station 200. This updating is illustrated with double-headed arrow 309.

Thereupon, mobile station 200 sends a query message to ANS-B 234 which provides the FQDN-B, as illustrated with arrow 310. The query is sent to cater for a case where mobile station 250 has performed a handover recently so that the new address for mobile station 250 has not yet been indicated to mobile station 100. Substantially simultaneously with the sending of query message 310, mobile station 200 sends also an ASCONF chunk to mobile station 250, as illustrated with arrow 311. The ASCONF chunk comprises a parameter, which indicates that mobile station 250 should add the new IP address of mobile station 200, namely IP-A', as the new peer IP address for the SCTP association. In one embodiment of the invention, AS-CONF chunk 311 also instructs mobile station 250 to delete the old IP address for mobile station 200, namely IP-A. In FIG. 3 it is assumed that the reply to the query message 310 is received before the acknowledging of the ASCONF chunk. However, if the acknowledgement of the ASCONF chunk is received before the reply to the query message, the mobile station 200 will not wait for the reply to the query message and assume that mobile station 250 has recorded IP-A' as the current peer address of mobile station 200 and continues by sending a DATA chunk with the TSN=2 to mobile station 250, as illustrated with arrow 314.

Thus, mobile station 200 receives a reply message 312 next from ANS-B 234, as illustrated with arrow 312. The reply message 312 provides the IP address presently associated with the logical name FQDN-B of mobile station 250. Thereupon, mobile station 200 receives an ASCONF ACK chunk from mobile station 250, as illustrated with arrow 313. ASCONF ACK chunk 313 indicates that mobile station 250 has recorded IP-A' as the current peer address for mobile station 200. Thereupon, mobile station 200 continues by sending a DATA chunk with the TSN=2 to mobile station 250, as illustrated with arrow 314. The DATA chunk is acknowledged by mobile station 250 with a SACK chunk with TNS=2 to mobile station 200, as illustrated with arrow 315. The matching TSN values indicate that there are no outstanding DATA chunks to be acknowledged. In FIG. 3 it has been assumed for simplicity that no SCTP chunks have been bundled in IP packets. However, several chunks may be combined in a single IP packet according to the rules of RFC 2960.

Figure 4:
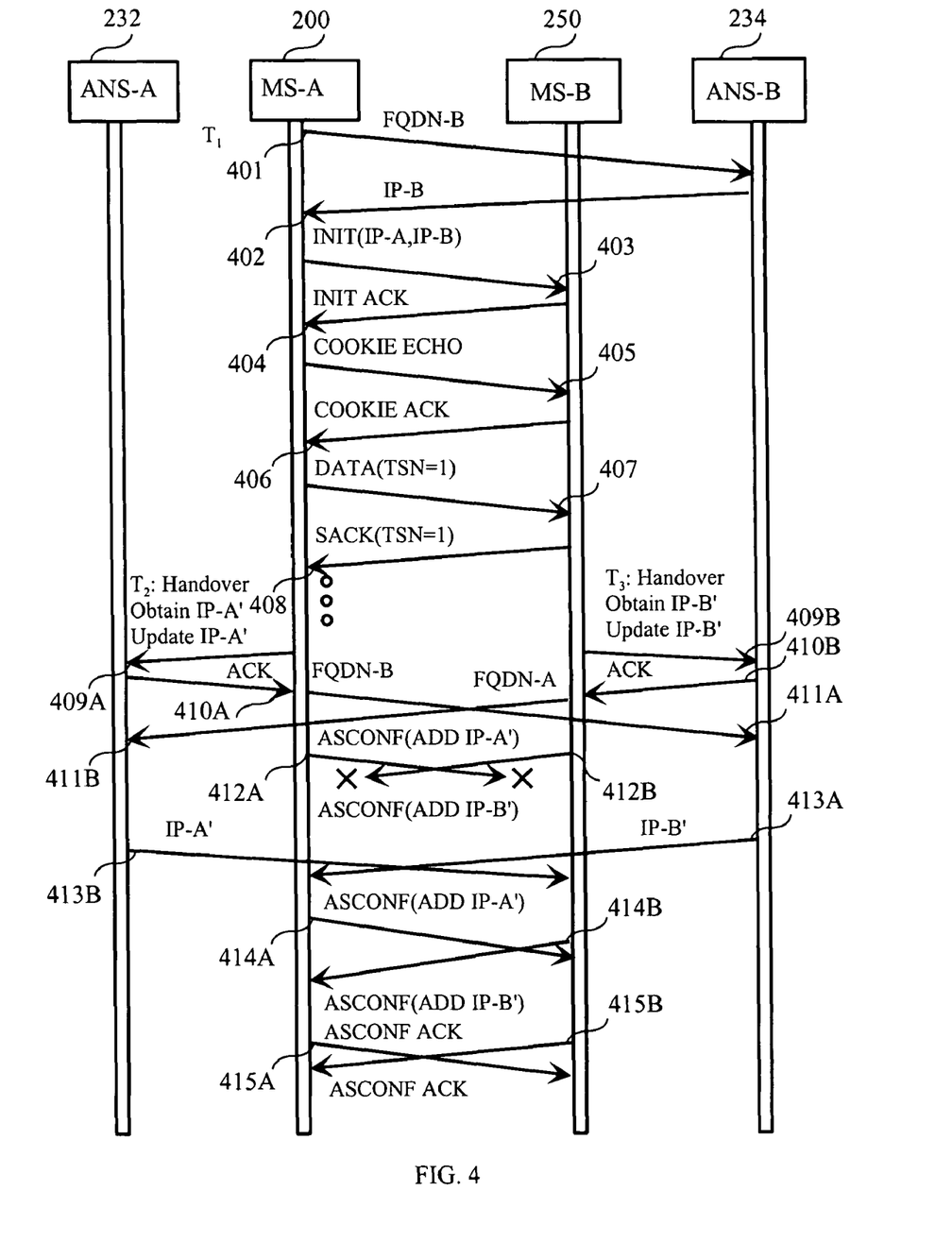
FIG. 4 is a message sequence chart illustrating simultaneous transport layer association handover for both association parties in one embodiment of the invention.

FIG. 4 is a message sequence chart illustrating simultaneous transport layer association handover for both association parties in one embodiment of the invention. In FIG. 4 there are illustrated Authoritative Name Servers (ANS) ANS-A 232 and ANS-B 234. There are also two mobile stations, namely, mobile station 200 and mobile station 250. Mobile station 200 is the initiating party for the establishing of an SCTP association between mobile stations 200 and 250, hence it is also indicated as MS-A, whereas mobile station 250 is also indicated as MS-B. The transport layer association handover is similar irrespective of the initiator of the association.

At time $T_1$ mobile station 200 detects a need to establish an SCTP association to mobile station 250. Mobile station 200 sends an enquiry message to ANS-B 234, as illustrated with arrow 401. The enquiry message provides the FQDN for mobile station 250, namely FQDN-B. The response message illustrated with arrow 402 carries the current IP address of mobile station 250, namely IP-B. Mobile station 200 stores the FQDN-B in its memory for further use during in possible handovers. Thereupon, mobile station 200 sends an SCTP INIT chunk to mobile station 250 as illustrated with arrow 403. The INIT chunk is carried in an IP packet, which specifies IP-B as the destination address and IP-A, the address of mobile station 200, as the source address. INIT chunk 403 is acknowledged by mobile station 250 to mobile station 200 with INIT ACK chunk, as illustrated with arrow 404. The INIT ACK chunk 404 is acknowledged by mobile station 200 with COOKIE ECHO chunk to mobile station 250, as illustrated with arrow 405. The COOKIE ECHO chunk returns the state cookie provided in the INIT ACK chunk. Upon receiving the COOKIE ECHO chunk mobile station 250 checks the state cookie. If the state cookie is considered valid in mobile station 250, it acknowledges the state cookie with COOKIE ACK chunk, as illustrated with arrow 406. At this stage the SCTP association initialization process is complete. The SCTP association initialization process is similar to the one described in association with FIG. 3.

Thereafter, mobile stations 200 and 250 may start exchanging DATA chunks that comprise upper layer protocol information. For example, mobile station 200 sends a DATA chunk with TSN value 1 to mobile station 250, as illustrated with arrow 407. The DATA chunk 407 is acknowledged by mobile station 250 with a SACK chunk, the TSN parameter of which indicates the successful receiving of the DATA chunk numbered 1. The SACK chunk is illustrated with arrow 408.

At time $T_2$ mobile station 200 detects a need to perform a handover to a new cell. Mobile station 200 moves to the area of a new cell wherein it is connected to a new access point and thus needs a new IP address. The new IP address, namely IP-A', is obtained, for example, from a Dynamic Host Configuration Protocol (DHCP) server (not shown) accessed via the new cell. Similarly, at time $T_3$ mobile station 250 also detects a need to perform a handover to a new cell. Mobile station 250 moves to the area of a new cell wherein it is connected to a new access point and thus needs a new IP address. The new IP address, namely IP-B' is obtained, for example, from a Dynamic Host Configuration Protocol (DHCP) server (not shown) accessed via the new cell. The times $T_2$ and $T_3$ differ only slightly, for example, less than 1 sec. This causes that the handover messaging sequences initiated by both parties are substantially parallel.

After the obtaining of the new IP address, namely address IP-A', mobile station 200 updates ANS-A 232 to associate IP-A' with the logical name of mobile station 200, as illustrated with arrows 409A and 410A. The similar update process to ANS-B by mobile station 250 is illustrated with arrows 409B and 410B. The same arrow numbers with different letters indicate the substantial simultaneity of the messages. The sending of the messages is not synchronized. The letters A and B indicate whether the message is related to mobile station 200, that is, party A or to mobile station 250, that is, party B.

Mobile stations 200 and 250 send a query messages to ANS-A 232 and ANS-B 234, respectively, as illustrated with arrows 411A and 411B. The query message illustrated with arrow 411A provides the FQDN-B to ANS-B 234, whereas query message illustrated with arrow 411B provides the FQDN-A to ANS-A 232. Without waiting for a reply from ANS-A 232 or ANS-B 234, mobile stations 200 and 250 proceed with providing their updated address information to one another. The queries to ANS-A 232 and ANS-B 234 are sent to cater for a case where either mobile station has performed a handover recently so that the new address for the mobile station has not yet been indicated to the mobile station. Mobile station 200 provides its updated IP address IP-A' to mobile station 250 in an ASCONF chunk carrying an IP address add request (ADD) for IP-A', as illustrated with arrow 412A. Similarly, mobile station 250 provides its updated IP address IP-B' to mobile station 250 in an ASCONF chunk carrying an IP address add request (ADD) for IP-B', as illustrated with arrow 412B. Due to the fact that both mobile station 200 and 250 have lost the connection to their previous cells and from the cells further to their previous points of attachment bound to their previous IP addresses, the IP packets carrying the ASCONF chunks are not received. However, upon receiving response messages from their peer respective authoritative name servers 232 and 234 carrying the new peer IP addresses IP-A' and IP-B', as illustrated with arrows 413B and 413A, mobile stations 200 and 250 may repeat the address update procedures with one another. Hence, mobile station 200 sends an ASCONF chunk carrying an IP address add request (ADD) for IP-A', as illustrated with arrow 412A. Similarly, mobile station 250 sends an ASCONF chunk carrying an IP address add request (ADD) for IP-B', as illustrated with arrow 412B. The ASCONF chunks are acknowledged to the peers, as illustrated with arrows 415A and 415B. Thereupon, mobile stations may continue sending a DATA chunks to each other.

In FIG. 4 it has been assumed for simplicity that no SCTP chunks have been bundled in IP packets. However, several chunks may be combined in a single IP packet according to the rules of RFC 2960.

Figure 5:
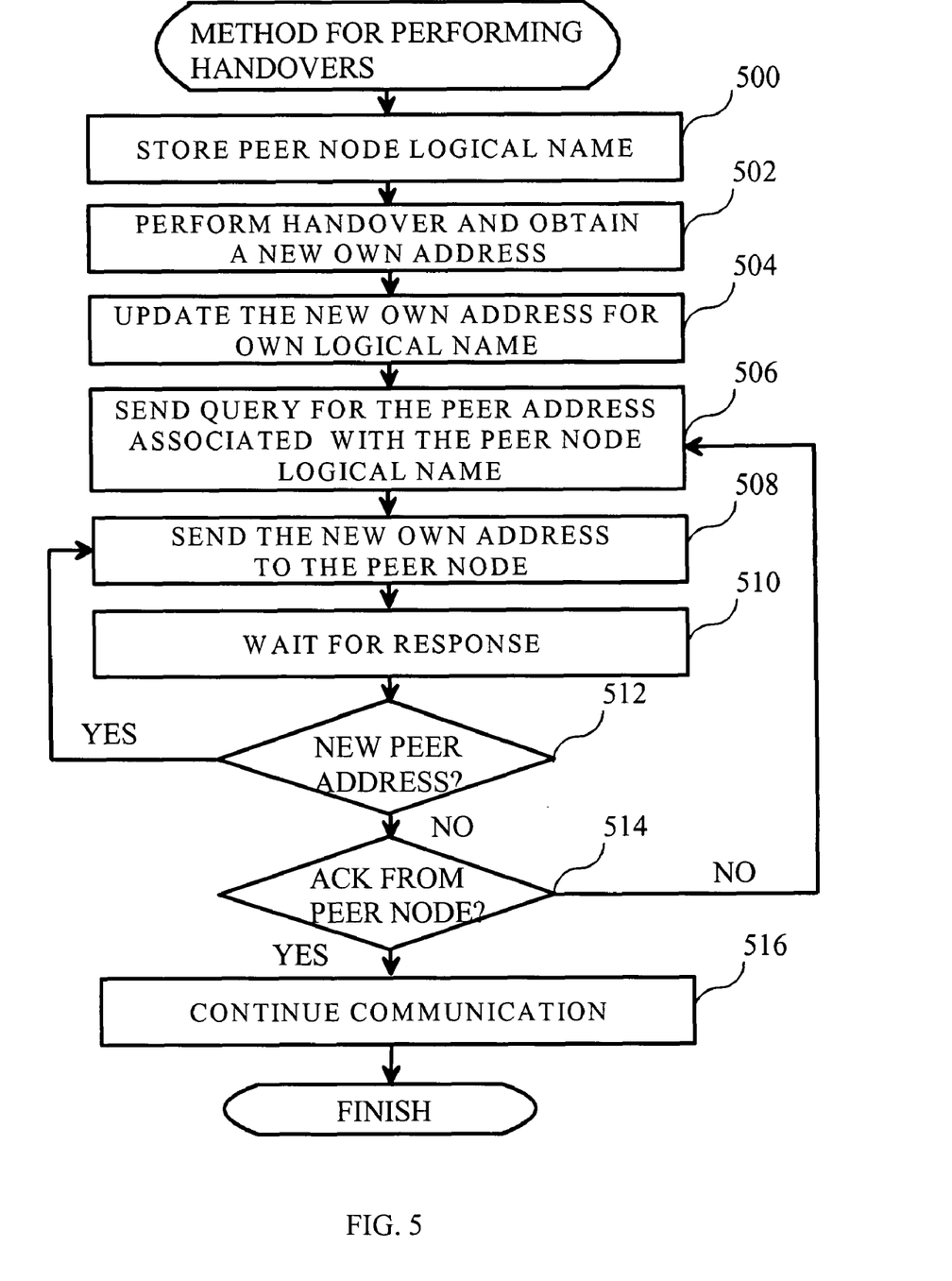
FIG. 5 is a flow chart illustrating a method for performing handover in one embodiment of the invention.

FIG. 5 is a flow chart illustrating a method for performing handover in one embodiment of the invention.

At step 500, a mobile node enquires a peer node network address from a first name server node using a logical name of the peer node. The mobile node stores the peer node logical name for further use to be prepared for handover situations. Thereupon, the mobile node establishes a transport layer association with the peer node using the network address of the peer node. In one embodiment of the invention, the peer node is also a mobile node. In one embodiment of the invention, the first name server node is a Domain Name System (DNS) server.

At step 502, the mobile node performs a handover and obtains a new own network address. The network address is, for example, an Internet Protocol (IP) address. The new address is obtained, for example, from a Dynamic Host Configuration Protocol (DHCP) server via a radio connection established via a new cell.

At step 504, the mobile node updates its new network address to a second name server node. The update provides the logical name associated with the mobile node together with the new network address. The update is acknowledged by the second name server node.

At step 506, the mobile node sends a query message to the first name server node. The query message carries the peer node logical name.

At step 508, without waiting for a response from the first name server node, the mobile node sends its own new network address to the peer node. A timer is set to supervise the receiving of a response from the peer node.

At step 510, the mobile node waits for a response from either the first name server node or from the peer node. If a response is received from neither node, a timer expiry is detected.

At step 512, it is checked if a new peer node network address is received from the first name server node. If this is the case, the method continues at step 508 and the timer is stopped. Otherwise, the method continues at step 514.

At step 514, it is checked if an acknowledgement for the new network address of the mobile node was received from the peer node or if the timer expiry was detected. If the acknowledgement was received, the method continues at step 516. If the timer expiry was detected, the method continues at step 506.

At step 516, the communication continues between the mobile node and the peer node.

Figure 6A:
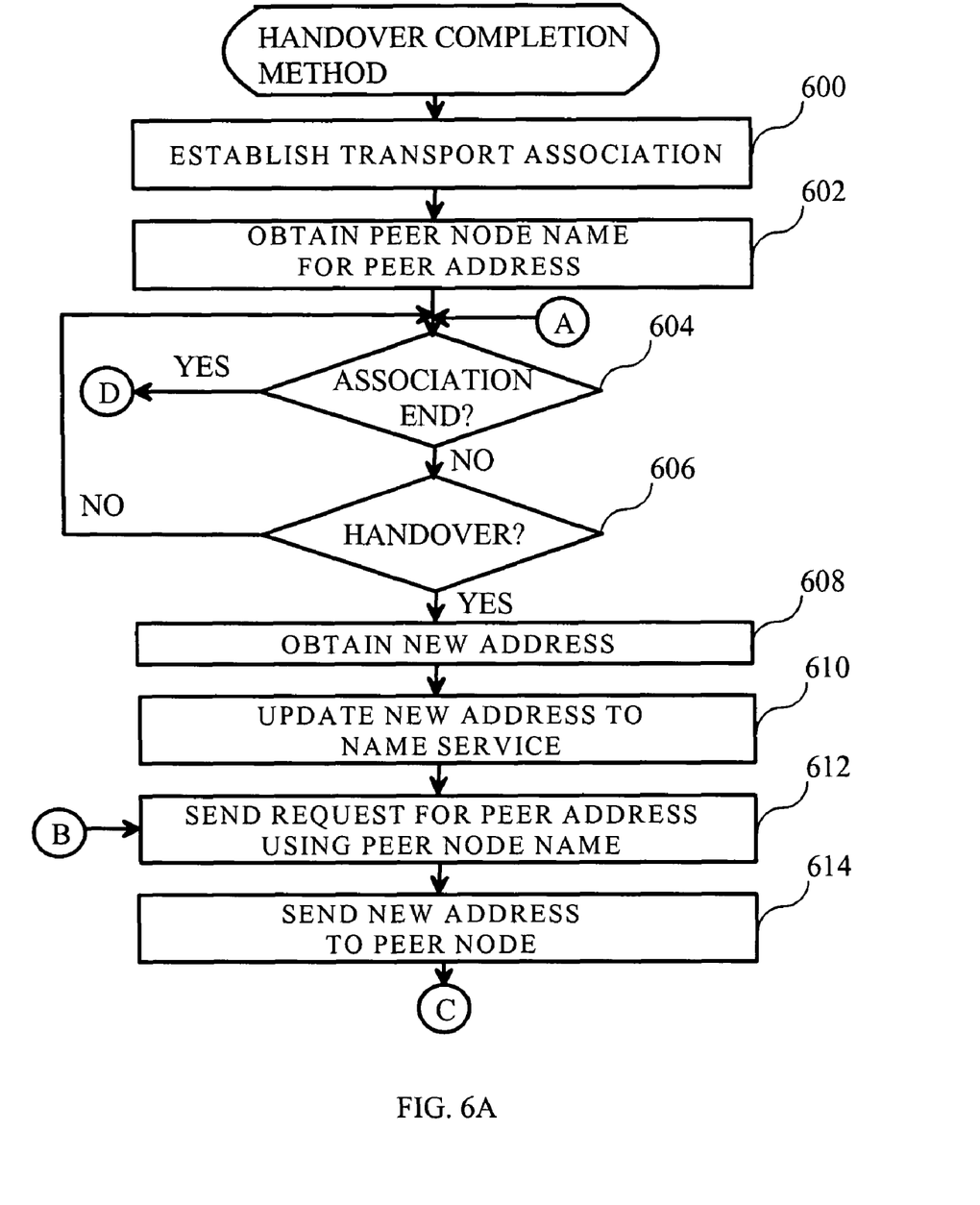
FIG. 6A is a flow chart illustrating a method for the completion of handover in one embodiment of the invention.

FIG. 6A is a flow chart illustrating a method for the completion of handover in one embodiment of the invention.

At step 600, a first mobile node starts establishing a transport association with a second mobile node. In one embodiment of the invention, the transport connection is an SCTP association. The second mobile node acknowledges the association establishment.

At step 602, the second mobile node obtains the name of the first mobile node using the address of the first mobile node. If the first mobile node has established the association using an address of the second mobile node, the first mobile node also obtains the name of the second mobile node using the address of the second mobile node. Thus, peer node names are obtained using peer addresses. The step of obtaining peer node names may also be performed during the course of the establishment of the transport association.

At step 604, it is checked if the association release is to be performed. If the association must be released, for example, due to a release request from either party, the association is released and the method is finished. If the connection is not to be released, the method continues at step 606.

At step 606, it is checked by the first or the second mobile node, if there is a handover. If there is no handover, the method continues at step 604. If there is a handover condition, the method continues at step 608.

At step 608, the node performing the handover allocates a radio resource from the target radio network and establishes radio communication with a base transceiver station from the target radio network. The node performing the handover obtains a new address from a packet switched network connected to the target radio network. The node performing the handover may be the first or the second network node.

At step 610, the new address is updated to a name service, which is responsible for providing an address for the node using its name. The name service may be the Internet Domain Name System (DNS). Thus, the peer node name may be, for example, a Fully Qualified Domain Name (FQDN). The peer node name may also be any logical name or address.

At step 612, the node that performed the handover sends a request for the peer address to the name service. The request specifies the peer node name.

At step 614, the new address is sent to the peer node from the node that performed the handover. A timer for a response from either the name service or the peer node is started.

Figure 6B:
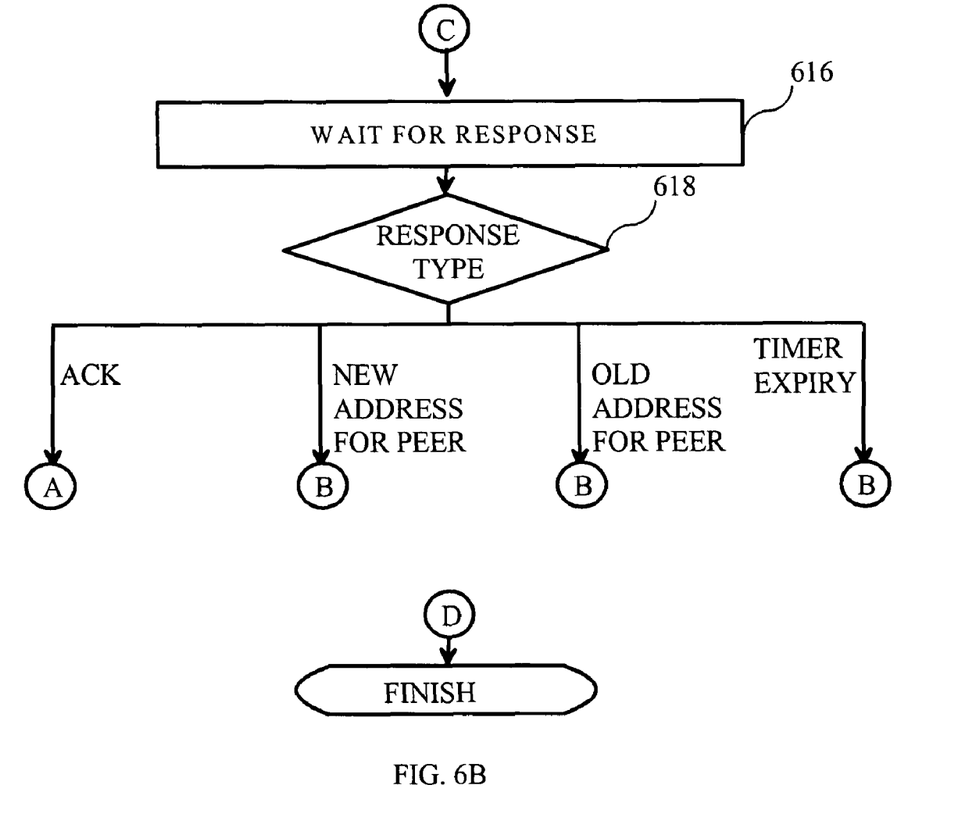
FIG. 6B is a flow chart illustrating the continuation of the method for the completion of handover in one embodiment of the invention.

FIG. 6B is a flow chart illustrating the continuation of the method for the completion of handover in one embodiment of the invention.

At step 616, the node that sent the request for the peer address to the name service and the new address to the peer node waits for a response from either the name service or the peer node. The method continues at step 618 as a response is detected.

At step 618, the type of the response detected is checked. If a reply was received from the peer node, the method continues at step 604. If a reply was received from the name service and the reply comprises a new address for the peer node, the method continues at step 612. If a reply is received from the name service and the reply still provides the old address for the peer node, the method continues at step 612. If the timer for the response expires, the method continues at step 612. The purpose of the repeated requests at step 612 is to obtain the new address for the peer node in case also the peer node has performed a handover and changed its address.

In one embodiment of the invention, the request for obtaining the peer address with the peer node name is sent only after the updating of the new address of the node that performed the handover to the peer node fails due to the lack of an acknowledgement from the peer node. Thus, the indication of the new address for the node that performed the handover is first attempted to the current address of the peer node. Only upon failure to receive a response from the old address, a new address for the peer node is enquired from the name service. Even after this, the informing of the new address for the node that performed the handover at steps 606 and 608, may still be attempted to the current address of the peer node while a response is waited for from the name service. If a new address of the peer node is obtained from either the name service or the peer node, the address for the node that performed the handover is naturally indicated repeatedly to the peer node. Thereupon, the node that performed the handover goes back to step 604 of the method. The peer node follows its own state model in response to handover conditions, the dialogue associated with the association and the dialogue associated with the name service that it uses.

Figure 7:
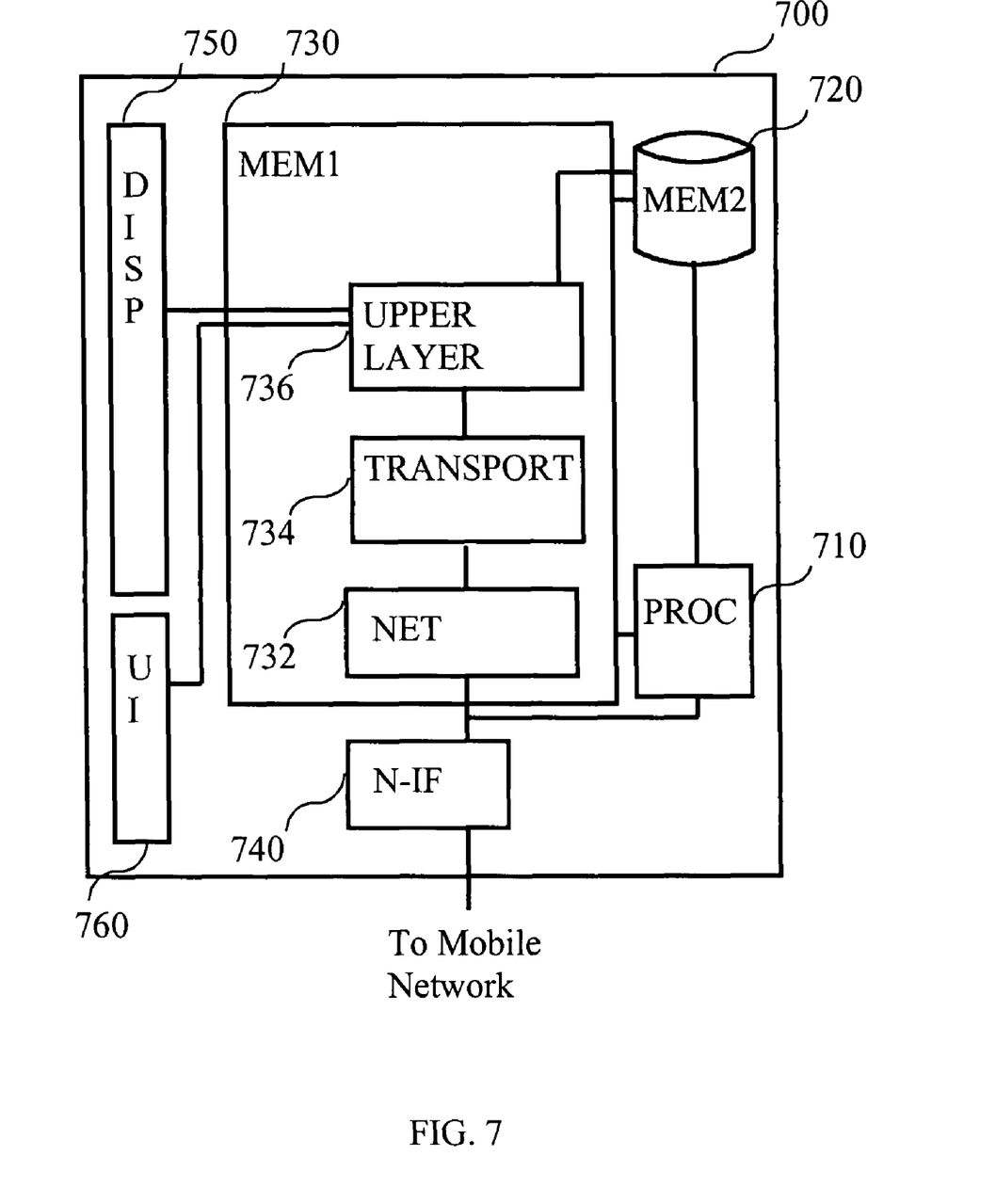
FIG. 7 is a block diagram illustrating a mobile node in one embodiment of the invention.

FIG. 7 is a block diagram illustrating an electronic device in one embodiment of the invention. The electronic device may be a mobile node such as mobile stations 200 and 250 illustrated in FIGS. 2, 3 and 4. In FIG. 7 there is an electronic device 700. Electronic device 700 comprises a processor 710 and a secondary memory 720. The secondary memory may be, for example, a hard disk or a flash memory or an optic disk. Electronic device 700 comprises also a primary memory 730. When processor 710 is executing network node functionality primary memory 730 comprises an upper layer entity 736, a transport entity 734 and a network entity 732. Network entity 732 may be, for example, a network layer entity. Electronic device also comprises a network interface unit 740, a display unit 750 and a user interface unit 760. The user interface unit may comprise, for example, a keypad, a keyboard and a pointer device. Upper layer entity 736 is, for example, a hypertext browser with a Hypertext Transfer Protocol (HTTP) parsing functionality, which uses transport entity 734 to exchange data with a remote node. Transport entity 734 is configured to comprise transport connection migration functions in order to perform a handover together with a peer transport entity. Transport entity 734 is also configured to control at least one transport process. A transport process comprises transport protocol state information and variables for a transport connection such as sequence numbers for packets sent and acknowledgements received. Network layer entity 732 comprises the network layer functions, for example, the Internet Protocol functions. Network interface 740 may be, for example, a Local Area Network interface, a Wireless Local Area Network (WLAN) interface, a radio interface for a mobile network or a Wide Area Network interface such as optic fiber.

In one embodiment of the invention, transport entity 734 and network entity 732 are comprised in the operating system of network node 700. The entities within electronic device 700 in FIG. 7, such as upper layer entity 736, transport entity 734 and network layer entity 732 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The entities may be implemented as separate computer programs or as a single computer program comprising several routines or functions implementing the entities. The program blocks are stored on at least one computer readable medium such as, for example, a memory circuit, memory card, magnetic or optic disk. Some entities may be implemented as program modules linked to another entity. The entities in FIG. 6 may also be stored in separate memories and executed by separate processors, which communicate, for example, via a message bus or an internal network within the network node.

An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (e.g., voice, modem, and the like), wireless communications media, one or more wireless communications networks, cellular communications networks, G3 communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method comprising:
    establishing a transport layer association between a first mobile node and a second mobile node, the first mobile node using a first address in the establishing of the transport layer association;
    detecting a handover condition in the first mobile node;
    obtaining a second address for the use of the first mobile node;
    updating the second address of the first mobile node to a first name server node;
    sending a query message for an address of the second mobile node to a second name server node;
    indicating the second address of the first mobile node to the second mobile node;
    waiting, at the first mobile node, for a response from the second mobile node;
    upon receiving a new address for the second mobile node from the second name server node, repeating the indicating of the second address of the first mobile node to the second mobile node, wherein the new address of the second mobile node is used as a destination address for said second mobile node;
    starting a timer for at least one of the receiving of the new address for the second mobile node from the second name server node and a receiving of an acknowledgement from the second mobile node in response to the indicating of the second address of the first mobile node; and
    upon expiry of the timer, repeating the sending and the indicating.

2. The method according to claim 1, wherein the waiting further comprises:
    waiting for a response from said second name server node in said first mobile node.

3. The method according to claim 1, the method further comprising:
    receiving said second address of said first mobile node in said second mobile node; and
    recovering said transport layer association between said first mobile node and said second mobile node based on said second address of said first mobile node.

4. The method according to claim 1, the method further comprising:
    sending an initial query message for an address of said second mobile node to said second name server node from said first mobile node;
    receiving an initial address of said second mobile node to said first mobile node; and
    storing a logical name for said second mobile node in said first mobile node.

5. The method according to claim 1, the method further comprising:
    receiving an address update message in said first name server node;
    extracting a logical name from said address update message;
    checking whether said logical name is associated with a mobile node; and
    assigning a higher priority to the updating of said address if said logical name is associated with a mobile node.

6. The method according to claim 1, the method further comprising:
    receiving query message in said first name server node, said query message providing a logical name;
    checking whether said logical name is associated with a mobile node; and
    assigning a higher priority to the processing of said query message if said logical name is associated with a mobile node.

7. The method according to claim 1, wherein said first name server node comprises a domain name server.

8. The method according to claim 1, wherein said first name server comprises at least part of a distributed hash table for mapping logical names to node addresses.

9. The method according to claim 1, wherein said transport layer association comprises a stream control transmission protocol association.

10. The method according to claim 1, wherein said first mobile node comprises a mobile station within a mobile communication system.

11. The method according to claim 1, wherein said first mobile node comprises a wireless local area network terminal.

12. An apparatus, comprising:
    at least one processor; and
    at least one memory including code, wherein the at least one memory and the code configured to, with the at least one processor, cause the apparatus to provide operations comprising:
        establishing a transport layer association between a first mobile node and a second mobile node, the first mobile node using a first address in the establishing of the transport layer association;
        detecting a handover condition in the first mobile node;
        obtaining a second address for the use of the first mobile node;
        updating the second address of the first mobile node to a first name server node;
        sending a query message for an address of the second mobile node to a second name server node;
        indicating the second address of the first mobile node to the second mobile node;
        waiting, at the first mobile node, for a response from the second mobile node;
        upon receiving a new address for the second mobile node from the second name server node, repeating the indicating of the second address of the first mobile node to the second mobile node, wherein the new address of the second mobile node is used as a destination address for said second mobile node;
        starting a timer for at least one of the receiving of the new address for the second mobile node from the second name server node and a receiving of an acknowledgement from the second mobile node in response to the indicating of the second address of the first mobile node; and upon expiry of the timer, repeating the sending and the indicating.

13. The apparatus according to claim 12, the apparatus further comprising:
waiting for a response from said second name server node.

14. The apparatus according to claim 12, the apparatus further comprising:
receiving said second address of said first mobile node in said second mobile node and to recover said transport layer association between said first mobile node and said second mobile node based on said second address of said first mobile node.

15. The apparatus according to claim 12, the apparatus further comprising:
sending an initial query message for an address of said second mobile node to said second name server node, to receive an initial address of said second mobile node to said apparatus and to store a logical name for said second mobile node in said apparatus.

16. The apparatus according to claim 12, wherein said transport layer association comprises a stream control transmission protocol association.

17. The apparatus according to claim 12, wherein said apparatus comprises a mobile station within a mobile communication system.

18. The apparatus according to claim 12, wherein said apparatus comprises a wireless local area network terminal.

19. An apparatus, comprising:
means for establishing a transport layer association between the apparatus and a second-mobile node, the apparatus using a first address in the establishing of the transport layer association;
means for detecting a handover condition;
means for obtaining a second address for the use of the apparatus;
means for updating the second address of the apparatus to a first name server node;
means for sending a query message for an address of the second mobile node to a second name server node;
means for indicating the second address of the apparatus to the second mobile node;
means for waiting for a response from the second mobile node in the apparatus;
means for repeating the indicating of the second address of the apparatus to the second mobile node upon receiving a new address for the second mobile node from the second name server node, wherein the new address of the second mobile node is used as a destination address for said second mobile node;
means for starting a timer for at least one of the receiving of the new address for the second mobile node from the second name server node and a receiving of an acknowledgement from the second mobile node in response to the indicating of the second address of the first mobile node; and
upon expiry of the timer, means for repeating the sending and the indicating.

20. A communication system, comprising:
a first mobile node configured to establish a transport layer association to a second mobile node, the first mobile node using a first address in the establishing of the transport layer association,
to detect a handover condition, to obtain a second address, to update the second address of the first mobile node to a first name server node,
to send a query message for an address of the second mobile node to a second name server node,
to indicate the second address to the second mobile node,
to wait for a response from the second mobile node,
upon receiving a new address for the second mobile node from the second name server node, to repeat the indication of the second address of the first mobile node to the second mobile node, wherein the new address of the second mobile node is used as a destination address for said second mobile node,
to start a timer for at least one of the receiving of the new address for the second mobile node from the second name server node and a receiving of an acknowledgement from the second mobile node in response to the indicating of the second address of the first mobile node, and
upon expiry of the timer, to repeat the sending and the indicating;
the second mobile node configured to establish a transport layer association with the first mobile node and to receive an indication of the second address of the first mobile node; and
the first name server node configured to update the second address for the first mobile node.

21. The communication system according to claim 20, the system further comprising:
said first name server node configured to receive an address update message, to extract a logical name from said address update message, to check whether said logical name is associated with a mobile node and to assign a higher priority to the updating of said address if said logical name is associated with a mobile node.

22. The communication system according to claim 20, the communication system further comprising:
said first name server node configured to receive a query message, said query message providing a logical name, to check whether said logical name is associated with a mobile node and to assign a higher priority to the processing of said query message if said logical name is associated with a mobile node.

23. A computer program embodied on a non-transitory computer readable storage medium, the computer program comprising code which when executed by a processor provide operations comprising:
establishing a transport layer association between a first mobile node and a second mobile node, the first mobile node using a first address in the establishing of the transport layer association;
obtaining a second address for the first mobile node;
updating the second address of the first mobile node to a first name server node;
sending a query message for an address of the second mobile node to a second name server node;
indicating the second address of the first mobile node to the second mobile node;
waiting for a response from the second mobile node;
upon receiving a new address for the second mobile node from the second name server node, repeating the indicating of the second address of the first mobile node to the second mobile node, wherein the new address of the second network node is used as a destination address for said second mobile node;
starting a timer for at least one of the receiving of the new address for the second mobile node from the second name server node and a receiving of an acknowledgement from the second mobile node in response to the indicating of the second address of the first mobile node; and upon expiry of the timer, repeating the sending and the indicating.

24. The computer program according to claim 23, wherein said computer readable storage medium is a removable memory card.

25. The computer program according to claim 23, wherein said computer readable storage medium is one of a magnetic disk and an optical disk.

\* \* \* \* \*